(12) United States Patent
Seachman

(10) Patent No.: US 6,198,088 B1
(45) Date of Patent: Mar. 6, 2001

(54) METHODS AND APPARATUS FOR DETECTING A DOCUMENT ON A PLATEN

(75) Inventor: Ned J. Seachman, Penfield, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/321,222

(22) Filed: May 27, 1999

(51) Int. Cl.[7] .................................................. H04N 1/04
(52) U.S. Cl. .................. 250/208.1; 399/380; 250/227.11
(58) Field of Search ........................... 250/208.1, 559.29, 250/578.1, 227.11; 358/484; 399/207, 379, 380

(56) References Cited

U.S. PATENT DOCUMENTS

| | | |
|---|---|---|
| 4,557,581 * | 12/1985 | Woolley et al. ........................... 355/1 |
| 4,630,127 * | 12/1986 | Fuwa ........................................ 399/16 |
| 5,119,212 * | 6/1992 | Mori et al. ............................ 399/380 |
| 5,790,211 | 8/1998 | Seachman et al. |

* cited by examiner

Primary Examiner—Stephone B. Allen
(74) Attorney, Agent, or Firm—Oliff & Berridge, PLC

(57) ABSTRACT

A platen cover assembly of an image processor includes a light source array that has a plurality of light sources arranged in a two-dimensional light source array, and a translucent white material covering at least a side of the light source array that faces a platen of the image processor. When a document is placed on a platen and covered by the platen cover assembly, a first scan of the platen is performed with a document illuminator of the digital image processor deactivated to sense light from exposed light sources of the light source array. The document illuminator is then activated, and a second scan is performed to obtain image data from the document. The obtained image data is then processed based on the size, location and/or orientation of the document, as determined from positions of the light sources detected during the first scan.

16 Claims, 5 Drawing Sheets

FIG. 1 (PRIOR ART)
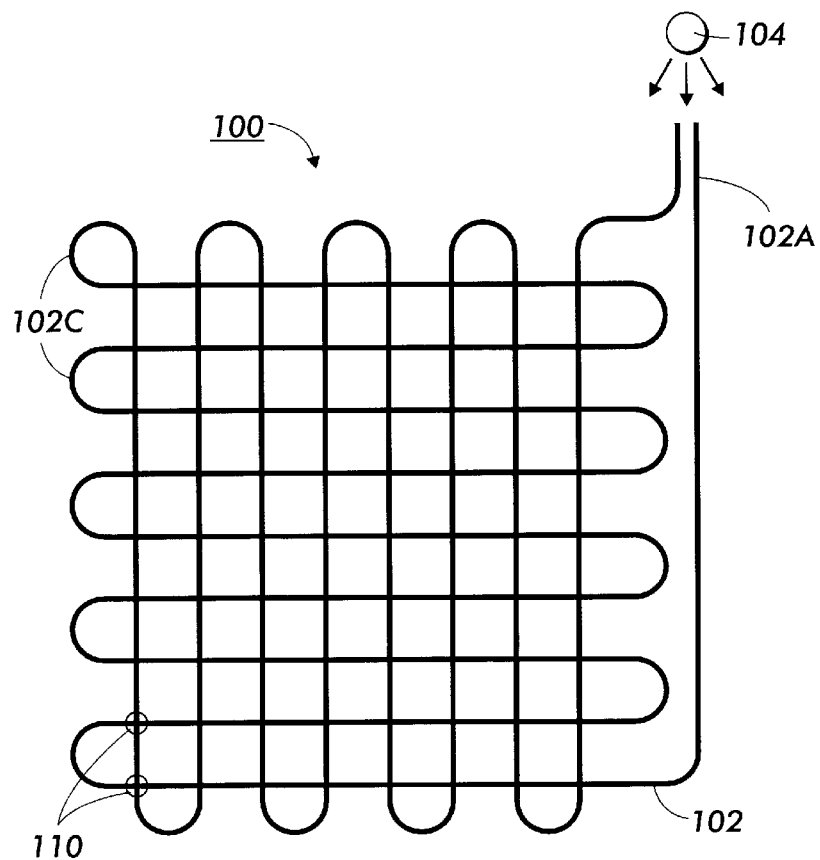
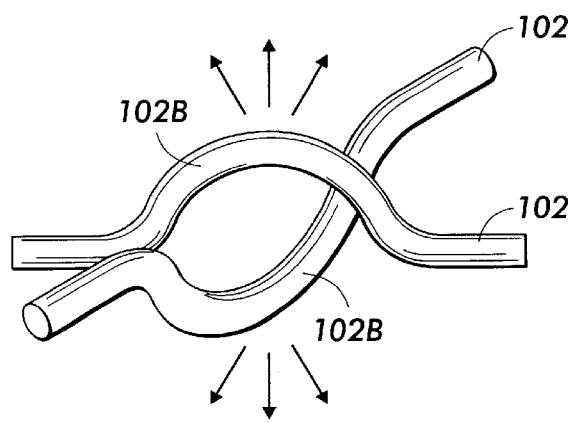
FIG. 2
(PRIOR ART)

METHODS AND APPARATUS FOR DETECTING A DOCUMENT ON A PLATEN

BACKGROUND OF THE INVENTION

1. Field of Invention

This invention relates to methods and apparatus for detecting size, location and/or orientation of a document on a platen of a copier or a scanner. More particularly, this invention relates to methods and apparatus for detecting size, location, shape and/or orientation of a document using a two-dimensional array of light sources provided on a platen cover assembly.

2. Description of Related Art

In a digital copier or a document scanner, it is desirable to accurately locate the edges of a document that has been placed on the platen of the copier or scanner. Using the detected edge information, image processing is performed to automatically deskew a copy of the document, properly register the copy on the copy paper, resize the copy to fit the selected paper size, and/or the like. One technique for locating the document edges is to use either a black or a specularly reflective platen cover. A prescan is performed with the copier's or scanner's existing document illuminator and sensor. During this prescan, the area surrounding the document appears darker than the body of the document, thereby permitting identification of the document's edges.

SUMMARY OF THE INVENTION

However, the black cover reduces the overall contrast of the image formed from the document reflection, and also causes features such as punched holes in the document to be copied as black features. The specularly reflective cover produces less contrast reduction, but still causes document holes to be reproduced as black images.

This invention provides methods and apparatus for detecting a document on a platen using a platen cover assembly with a two-dimensional array of light sources. The two-dimensional array of light sources may extend over the full area of a platen cover assembly or just a portion of this assembly. Furthermore, the two-dimensional array of light sources may be aperiodic or include multiple smaller two-dimensional arrays.

In one aspect, the methods and apparatus of this invention provide a platen cover assembly that includes a light source array having a plurality of light sources arranged in a two-dimensional array, and a translucent white material covering at least a side of the light source array that faces a platen.

The light source array preferably includes a fiber optic mat that has at least one optical fiber arranged to form a plurality of optical fiber bends, each of the plurality of light sources corresponding to a respective one of the optical fiber bends. At least one light source introduces light into the at least one optical fiber.

In another aspect, the methods and apparatus of this invention provide a digital image processor that includes a platen, a platen cover assembly with a two-dimensional light source array, a document illuminator, a sensor, and a controller. The controller causes the sensor to sense light from exposed light sources of the light source array during an off state of the document illuminator, and causes the sensor to pick up an image of a document placed on the platen during an on state of the document illuminator.

In yet another aspect, the methods and apparatus of this invention provide a method for detecting a document on a platen of a digital image processor that includes a platen cover with a two-dimensional light source array and a document illuminator. The method includes placing a document on the platen, with the platen cover covering the document and the platen, performing a prescan of the platen to sense light from exposed light sources of the light source array during an off state of the document illuminator, and generating a document map based upon the light sensed during the prescan.

Since the edges of the document may be located using the thus-generated document map, scanning of the document may be performed using a platen cover assembly that reflects white light. Therefore, document features such as punched holes are not reproduced as black features.

These and other features and advantages of this invention are described in or are apparent from the following detailed description of various exemplary embodiments.

BRIEF DESCRIPTION OF THE DRAWINGS

Various exemplary embodiments of this invention will be described in detail, with reference to the following figures, in which:

FIG. 1 shows one exemplary embodiment of a fiber optic mat used in this invention;

FIG. 2 shows an enlarged view of optical fiber bend portions in the fiber optic mat of FIG. 1;

DETAILED DESCRIPTION OF PREFERRED EMBODIMENTS

FIG. 1 shows a fiber optic mat 100 that includes a flexible optical fiber 102 that is arranged so that it crosses itself in a rectangular crossing pattern. Light from a light source 104, which may, for example, be a tungsten point source or a visible light emitting diode, enters end portions 102A of the optical fiber 102. It should be appreciated that, rather than a single optical fiber 102 and/or a single light source 104, a plurality of optical fibers and/or a plurality of light sources may be used.

The optical fiber 102 includes a transparent core material and a transparent cladding. The transparent core material has a higher index of refraction than the transparent cladding. Therefore, light entering the optical fiber 102 at angles less than a critical angle is guided through the length of the optical fiber 102 by total internal reflection that occurs at the core/cladding interface.

At each intersection where the optical fiber 102 crosses itself or another optical fiber, a bend portion 102B is formed in the optical fiber 102, as shown in FIG. 2. If a bend portion 102B has a sufficiently small radius, a fraction of the light traveling through the optical fiber 102 will leak out of the optical fiber 102 at the bend portion 102B because some light rays will strike the core/cladding interface at angles greater than the critical angle required for total internal reflection.

Therefore, if at least one optical fiber at each intersection has a bend 102B with a sufficiently small radius, light is emitted at each intersection. Therefore, the fiber optic mat 100 can be used to produce a two-dimensional, grid-like array of light spots or effective light sources 110 from a single light source 104, or from a relatively small number of light sources. Fiber optic mats such as the illustrated fiber optic mat 100 are commercially available from Lumitex, Inc. of Strongsville, Ohio, for example.

It also should be appreciated that, instead of or in addition to the optical fiber 102 crossing itself and/or another optical fiber, a plurality of bend-forming members (not shown), such as ridges or small-diameter rods or wires or the like, may be provided, and the optical fiber may be arranged so that it crosses these bend-forming members, thereby forming bend portions 102B.

It should also be appreciated that bend portions 102C (FIG. 1) are formed at points where the optical fiber 102C doubles back on itself. Bend portions 102C will also allow light to leak out if they have a sufficiently small diameter. This light may, if desired, be utilized to form additional light sources 110.

Figure 3:
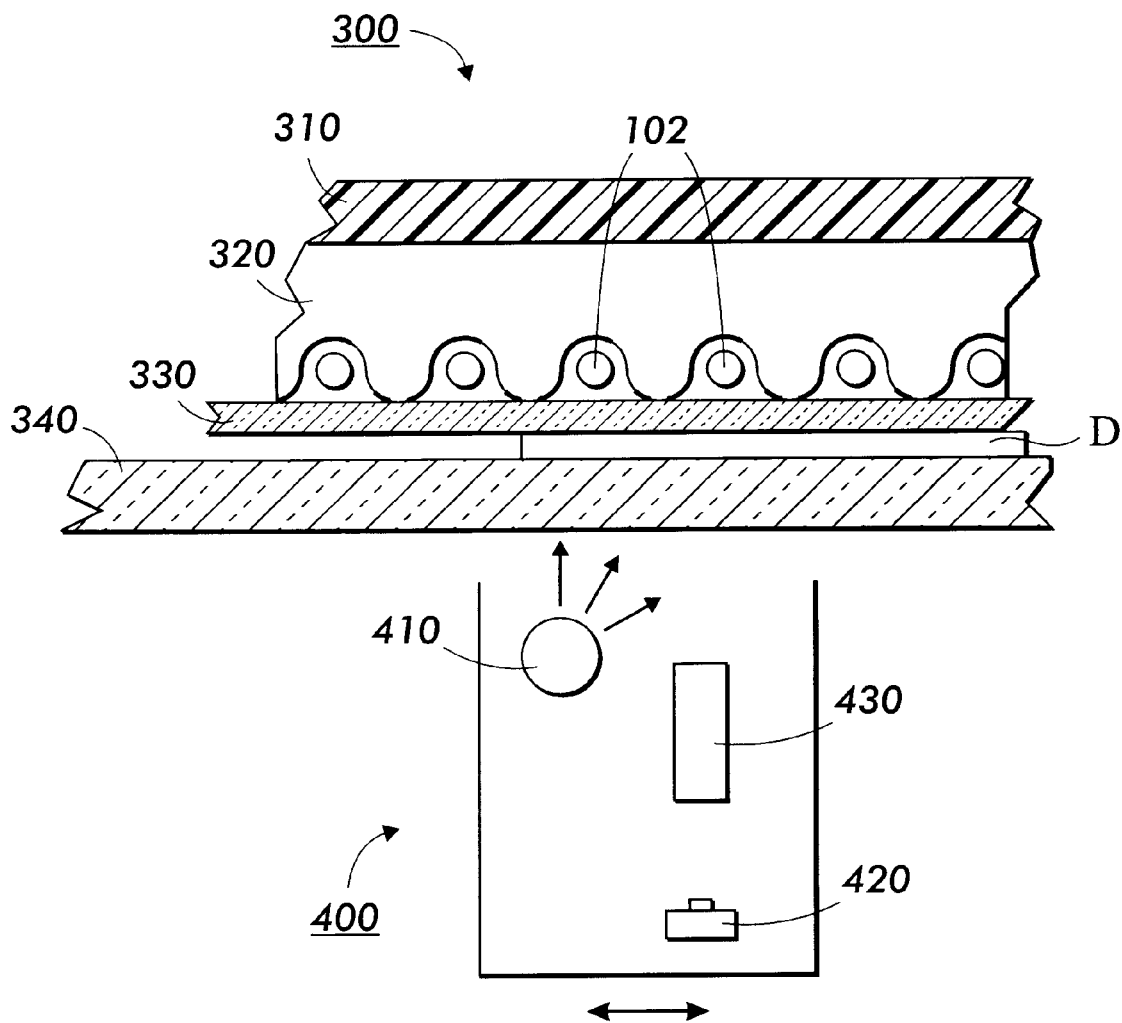
FIG. 3 is a cross sectional view of one exemplary embodiment of a platen cover assembly according to this invention.

FIG. 3 illustrates one exemplary embodiment of a platen cover assembly 300 according to this invention. The platen cover assembly 300 includes the fiber optic mat 100 of FIG. 1. Specifically, the platen cover assembly 300 includes a rigid platen cover top 310, a pad member 320, which may, for example, be a resiliently compressible pad, and a white translucent material 330, which may, for example, be a white translucent sheet. The white translucent material 330 may be any material that allows at least some light from the fiber optic mat 100 to pass through, and which diffusely reflects light from a document illuminator, described below. The optical fiber 102 of the fiber optic mat 100 is embedded in the pad member 320.

One purpose of the platen cover assembly 300 is to provide both a two-dimensional array of light sources that may be sensed by a sensor, and a surface that reflects white light such that the reflected light may be sensed by the sensor. Although one exemplary structure of the platen cover assembly 300 has been illustrated, it should be appreciated that variations and modifications may be made to the illustrated structure while still accomplishing this purpose. For example, the platen cover top 310 may be omitted, or the fiber optic mat 100 may be attached directly to the platen cover top 310, and the pad member 320 omitted. Furthermore, instead of the fiber optic mat 100, any other two-dimensional array of light sources, fiber optic or otherwise, could be used. For example, a two-dimensional array of light emitting diodes or laser diodes, each being electrically connected to a power source, could be used. Also, the platen cover light sources may include multiple smaller arrays critically located to detect selected document features.

A document D is placed on a platen 340, and the platen cover assembly 300 is closed on top of the document D and the platen 340. A scanning assembly 400 reciprocates back and forth below the platen 340. The scanning assembly 400 includes a document illuminator 410, a sensor 420, and an imaging lens 430. It should be appreciated that the document illuminator 410 may be provided separately from the scanning assembly 400.

The lens 430 may, for example, be a conventional SEL-FOC™ lens that is formed as a plurality of 1:1 lens elements, or may include a plurality of reduction lenses, or a single reduction lens. The particular lens or lens configuration will depend, for example, on the type of sensor used, and will be obvious and predictable to those skilled in the art, as the implementation of scanning assemblies such as the scanning assembly 400 is well understood by those skilled in the art.

The lens 430 collects light reflected from the document D and the exposed part of the white translucent material 330 when the document illuminator 410 is activated, and collects light from the bend portions 102B of the optical fiber 102 that passes through the white translucent material 330 when the light source 104 is activated and the document illuminator 410 is not activated. The lens 430 produces an image of the document D and the exposed part of the white translucent material 330 on the sensor 420. The sensor 420 converts this light image to a corresponding electrical signal image.

Figure 4:
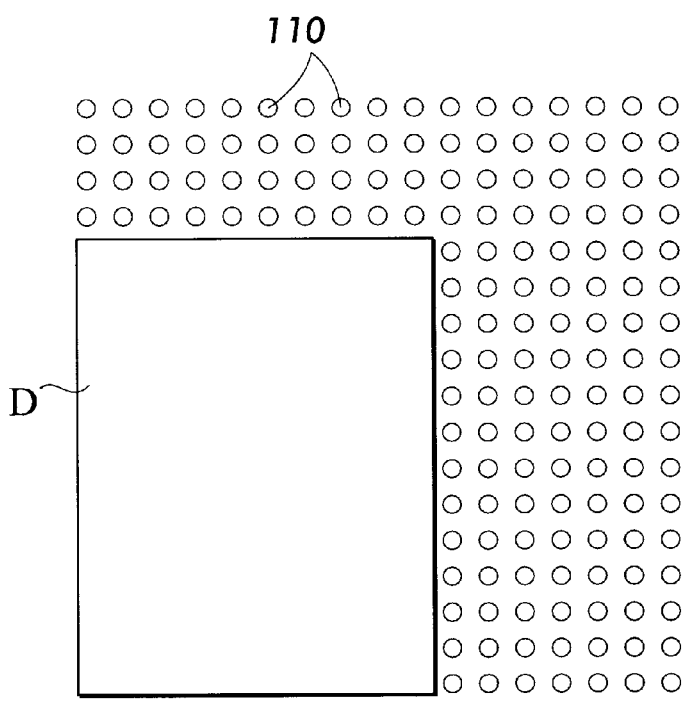
FIG. 4 shows one example of document detection according to this invention.

FIG. 4 illustrates one example of document detection according to this invention. In FIG. 4, the document D covers a portion of the light sources 110, which correspond to the intersections of the optical fiber 102 shown in FIG. 1. Based upon the positions of the detected light sources 110, the size, location, and/or orientation of the document D can be detected. Deskewing, registering, and/or resizing of a copy that is made from the original document D can be performed using conventional image processing algorithms, once the size, location, and/or orientation of the document D is known.

Figure 5:
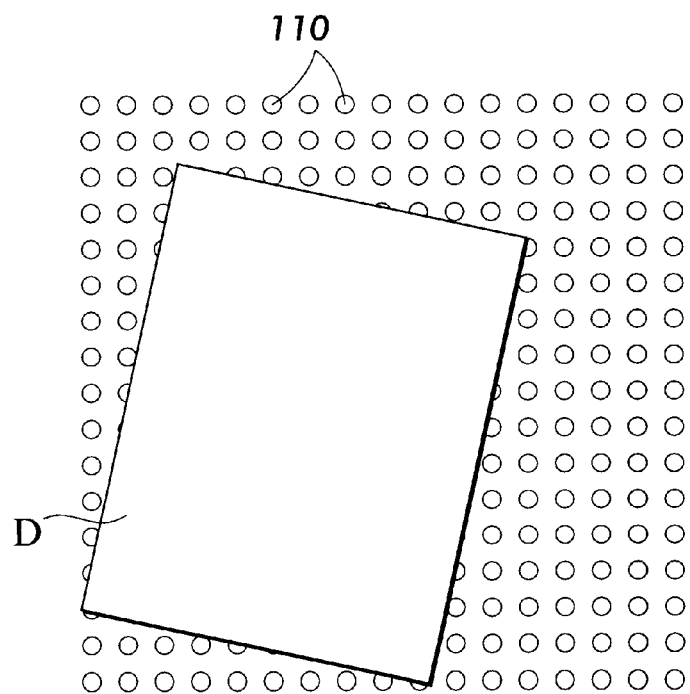
FIG. 5 shows another example of document detection according to this invention.

FIG. 5 illustrates another example of detecting a document according to this invention. In FIG. 5, the document D is in a skewed position with respect to the platen 340 and platen cover assembly 300 (FIG. 3). Nevertheless, based upon the positions of the detected light sources 110, the edges of the document can be properly located, and deskewing, registering and/or resizing can be performed in the same manner as described above.

Figure 6:
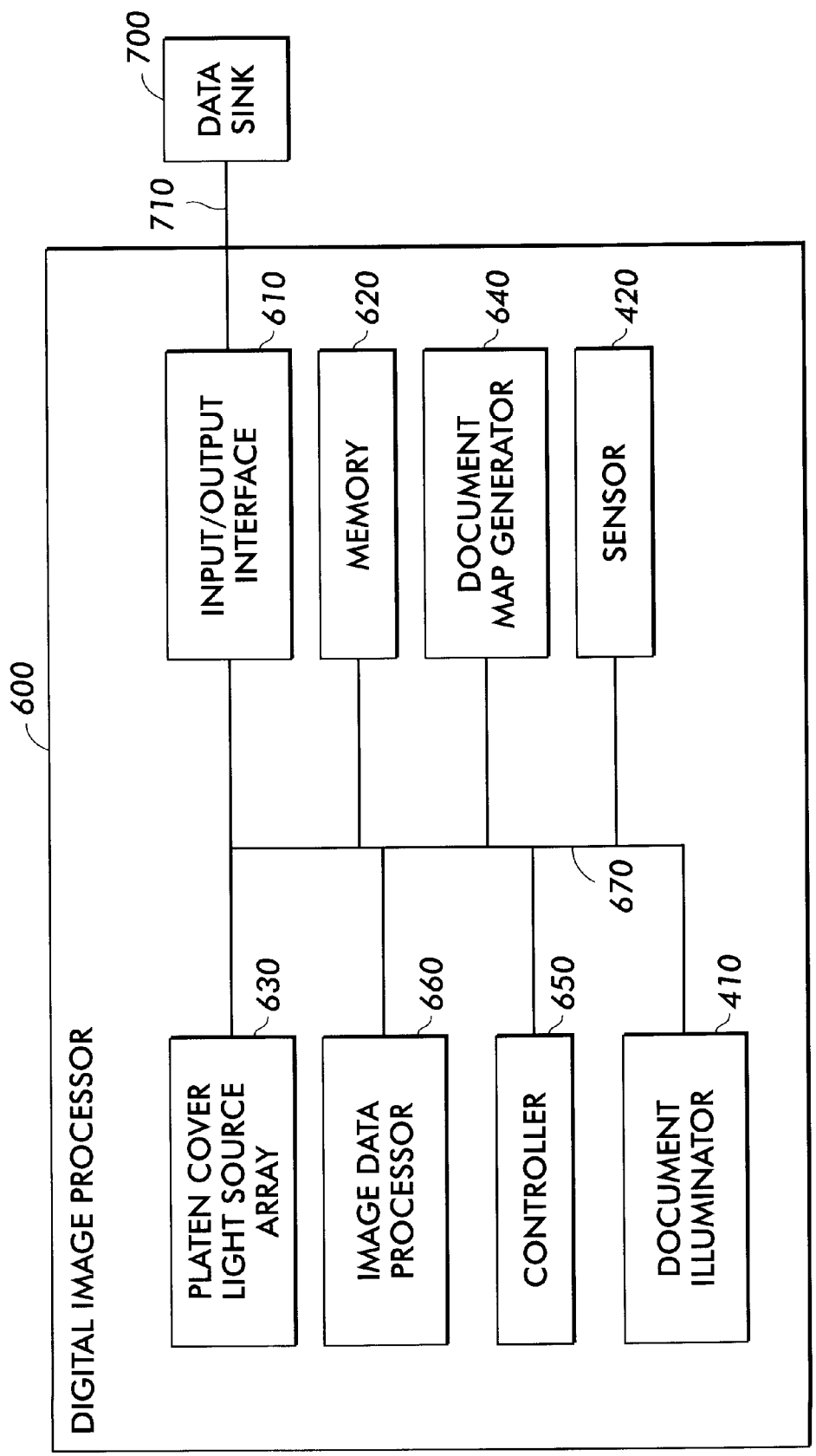
FIG. 6 is a functional block diagram of one exemplary embodiment of a digital image processor according to this invention.

FIG. 6 shows a functional block diagram of one exemplary embodiment of a digital image processor 600 according to this invention. The digital image processor 600 includes an input/output interface 610, a memory 620, a platen cover light source array 630, a document map generator 640, a controller 650, an image data processor 660, and the document illuminator 410 and the sensor 420 of FIG. 3, all of which are interconnected by a data/control bus 670. The digital image processor 600 shown in FIG. 6 is connected to a data sink 700 over a signal line or link 710. Alternatively, the data sink 700 may be an integral part of the digital image processor 600, and connected directly to the data/control bus 670. An example of this alternative configuration would be a digital copier or the like.

In general, the data sink 700 can be any known or later developed device that is capable of receiving data output by the digital image processor and either storing, transmitting or displaying the data. Thus, the data sink 700 can be either or both of a channel device for transmitting the data for display or storage or a storage device for indefinitely storing the data until there arises a need to display or further transmit the data.

The channel device can be any known structure or apparatus for transmitting data from the digital image processor 600 to a physically remote storage or display device. Thus, the channel device can be a public switched telephone network, a local or wide area network, an intranet, the Internet, a wireless transmission channel, any other distributing network, or the like. Similarly, the storage device can be any known structural apparatus for indefinitely storing image data such as a RAM, a hard drive and disk, a floppy drive and disk, an optical drive and disk, a flash memory or the like. For example, the data sink 700 may be a printer, a facsimile machine, a digital copier, a display, a host computer, a remotely located computer, or the like.

Moreover, various components of the digital image processor 600, such as the document map generator 640, the controller 650 and/or the image data processor 660, can be implemented as software executed on a programmed general purpose computer, a special purpose computer, a microprocessor or the like. In this case, these components can be implemented as one or more routines embedded in a printer driver, as resources residing on a server, or the like.

The memory 620 is preferably implemented using static or dynamic RAM. However, the memory 620 can also be implemented using a floppy disk and disk drive, a writable optical disk and disk drive, a hard drive, flash memory or the like.

The link 710 can be any known or later developed device or system for connecting the digital image processor 600 to the data sink 700, including a direct cable connection, a connection over a wide area network or a local area network, a connection over an intranet, a connection over the Internet, or a connection over any other distributed processing network or system. Further, it should be appreciated that the sink 700 may be connected to the digital image processor 600 directly, as a dedicated device.

While the data sink 700 is shown as a separate device from the digital image processor 600, the digital image processor 600 may be an integrated device, such as a digital copier, computer with a built-in printer, or any other integrated device that is capable of producing a hard copy image output. With such a configuration, for example, the data sink 700 and the digital image processor 600 may be contained within a single device. For example, in the case of a digital copier, the digital image processor 600 and the data sink 700 may be provided in the same machine. As another example, in the case of a scanner, the digital image processor 600 and the data sink 700, for example a printer or a computer memory, may be physically separate.

The platen cover light source array 630, which may be formed, for example, by the woven fiber optic mat 100 described above, and the document illuminator 410 are controlled by the controller 650. When the platen cover light source array 630 is activated and the document illuminator 410 is in an inactive state, the controller 650 controls the sensor 420 to pick up an image of the platen cover light source array 630. Specifically, the sensor 420 senses any exposed light sources of the platen cover light source array 630. Using the data thus obtained from the platen cover light source array 630 by the sensor 420, the document map generator 640 generates a document map of a document that is positioned between the image pick-up device 650 and the platen cover light source array 630. This document map may indicate, for example, the size, location and/or orientation of the document. It may also indicate the location, shape and/or size of transparent portions of the document, such as document holes including punched holes, holes caused by tearing of the document, staple holes, torn-off corners of the document, and/or the like.

It should be appreciated that, the greater the density of the light sources of the platen cover light source array 630, the greater will be the precision of the document map generated by the document map generator 640. When the fiber optic mat 100 is used as the platen cover light source array 630, the light source density is determined, for example, by a weave density of the fiber optic mat 100. Therefore, a desired light source density may be obtained by selecting a fiber optic mat 100 with an appropriate weave density.

When the document illuminator 410 is activated and the platen cover light source array 630 is deactivated, the controller 650 causes the sensor 420 to pick up an image of the document. More specifically, the sensor senses light reflected from the document and from the exposed portion of a platen cover assembly, such as the platen cover assembly 300 shown in FIG. 3. Picked-up image data from the document is then modified by the image data processor 660 according to the document map that has been generated by the document map generator 640. This image processing may include, for example, conventional deskewing, registering and/or resizing algorithms. Other image processing may include the replacement of image data from detected holes in the document with image data matching the document background surrounding the holes. This latter processing is particularly useful if the document background is not white.

After being processed by the image data processor 660, the image data is output to the data sink 700. The data may be stored in the memory 620 before, during and/or after processing by the image data processor 660, as necessary.

It should be understood that various components of the digital image processor 600 shown in FIG. 6, such as the document map generator 640, the controller 650 and the image data processor 660, can be implemented as portions of a suitably programmed general purpose computer. Alternatively, these components can be implemented as physically distinct hardware circuits within an ASIC, or using an FPGA, a PDL, a PLA, or a PAL, or using discrete logic elements or discrete circuit elements. The particular form each of the components shown in FIG. 6 will take is a design choice and will be obvious and predictable to those skilled in the art.

Figure 7:
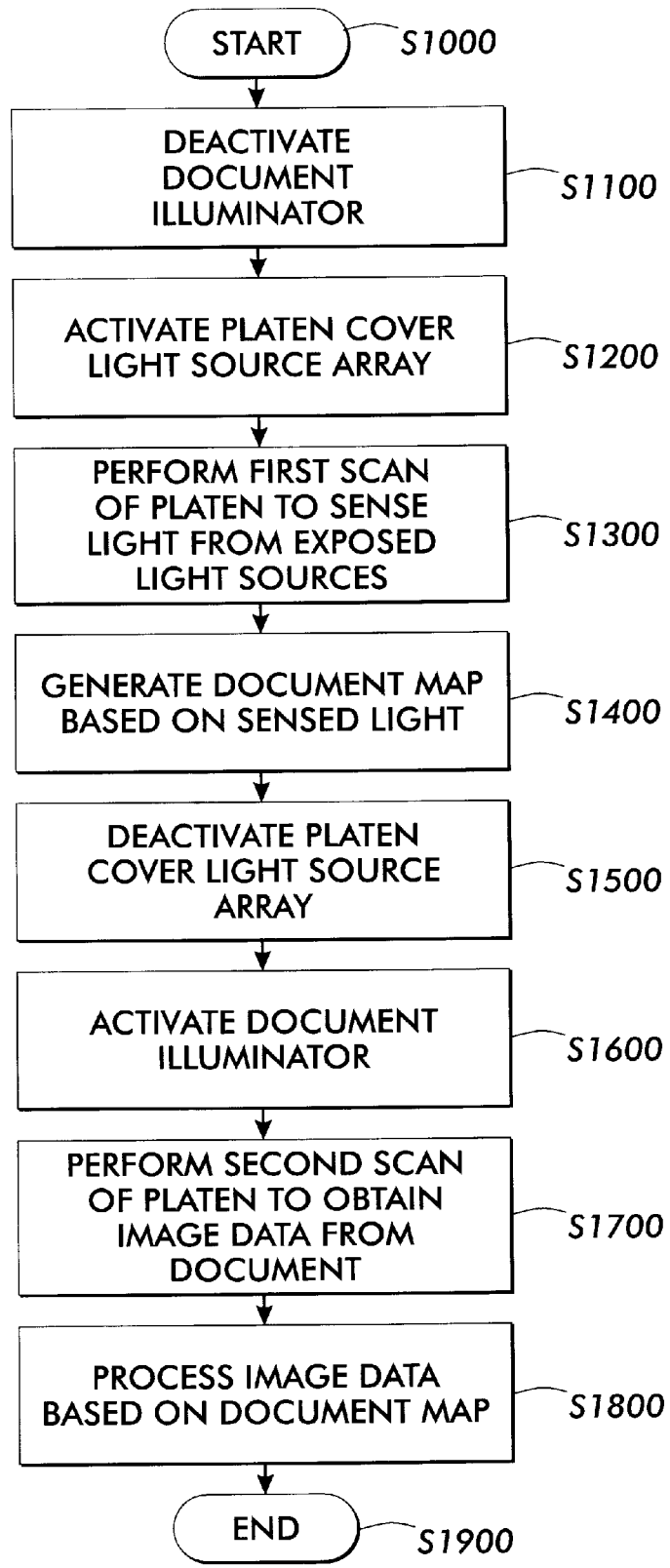
FIG. 7 is a flowchart outlining one exemplary embodiment of a method for detecting a document according to this invention.

FIG. 7 is a flowchart outlining one exemplary embodiment of a method for detecting a document according to this invention. Beginning in step S1000, control continues to step S1100, where a document illuminator is deactivated. Next, in step S1200, a platen cover light source array is activated. It should be appreciated that the order of steps S1100 and S1200 may be reversed. It should also be appreciated that, if the document illuminator is normally in a deactivated, or off, state, step S1100 is unnecessary and may be omitted. Similarly, if the platen cover light source array is normally activated, or in an on state, step S1200 is unnecessary and may be omitted.

Control then proceeds to step S1300, where a first scan is performed to sense light from exposed light sources in the platen cover light source array. Next, in step S1400, a document map is generated based on the positions of the light sensed in step S1300. Control then proceeds to step S1500. In step S1500, the platen cover light source array is deactivated, and, in step S1600, the document illuminator is activated. It should be appreciated that the order of steps S1500 and S1600 may be reversed.

Next, in step S1700, a second scan is performed to obtain image data from a document. Control then continues to step S1800, where the image data obtained in step S1700 is processed according to the document map generated in step S1400. The image processing of step S1800 is conventional image processing, and may, for example, include any known or later developed image processing algorithm, including deskewing, registering and/or resizing. Finally, in step S1900, the control procedure ends.

While the invention has been described in conjunction with the specific embodiments described above, many equivalent alternatives, modifications and variations will become apparent to those skilled in the art once given this disclosure. Accordingly, the preferred embodiments of the invention as set forth above are considered to be illustrative and not limiting. Various changes to the described embodiments may be made without departing from the spirit and scope of the invention.

What is claimed is:

1. A platen cover assembly, comprising:

a light source array comprising a plurality of light sources arranged in a two-dimensional array; and a layer covering at least a side of the light source array that faces a platen, the layer at least partially transmitting light emitted from the plurality of light sources to the platen.

2. The platen cover assembly as set forth in claim 1, wherein the light source array comprises:

a fiber optic mat comprising at least one optical fiber arranged to form a plurality of optical fiber bends, each of the plurality of light sources corresponding to a respective one of the optical fiber bends; and at least one light source that introduces light into the at least one optical fiber.

3. The platen cover assembly as set forth in claim 2, further comprising a pad member, the fiber optic mat embedded in the pad member and positioned between the layer and the pad member.

4. The platen cover assembly as set forth in claim 3, wherein the pad member is resiliently compressible.

5. The platen cover assembly as set forth in claim 1, wherein the platen cover assembly is attached to one of an analog copier, a digital copier and a scanner.

6. An image processor, comprising:

a platen;

a platen cover assembly comprising a light source array that comprises a plurality of light sources arranged in a two-dimensional array;

a document illuminator that has an on state and an off state;

a sensor; and a controller that causes the sensor to sense light from exposed light sources among the plurality of light sources of the light source array during the off state of the document illuminator, and causes the sensor to pick up an image of a document placed on the platen during the on state of the document illuminator.

7. The image processor as set forth in claim 6, wherein the light source array comprises:

a fiber optic mat comprising at least one optical fiber arranged to form a plurality of optical fiber bends, each of the plurality of light sources corresponding to a respective one of the optical fiber bends; and a light source that introduces light into the at least one optical fiber.

8. The image processor of claim 6, wherein the image processor is one of an analog copier, a digital copier and a scanner.

9. A method for detecting a document on a platen of an image processor that includes a platen cover with a two-dimensional light source array, and a document illuminator that has an on state and an off state, the method comprising:

placing a document on the platen, the platen cover covering the document and the platen;

performing a first scan of the platen to sense light from exposed light sources of the light source array during the off state of the document illuminator; and generating a document map based upon the light sensed during the first scan.

10. The method as set forth in claim 9, further comprising:

placing the document illuminator in the on state; and performing a second scan of the platen to obtain image data from a document that is placed on the platen.

11. The method as set forth in claim 10, further comprising processing the image data obtained during the second scan based on the document map.

12. The method as set forth in claim 11, wherein processing the image data comprises at least one of deskewing, registering, and resizing the obtained image data.

13. The method as set forth in claim 11, wherein processing the image data comprises replacing image data from holes in the document detected based on the document map with data derived from background data surrounding the holes.

14. The method as set forth in claim 10, further comprising controlling an image forming operation based on the document map.

15. The method as set forth in claim 14, wherein controlling an image forming operation comprises at least one of:

selecting a paper size to be used to form an image from the image data;

selecting an orientation of an image on a marking substrate; and selecting a marking position of an image on a marking substrate.

16. The method as set forth in claim 10, further comprising outputting the image data and the document map to an image data sink.

* * * * *